UNITED STATES PATENT OFFICE.

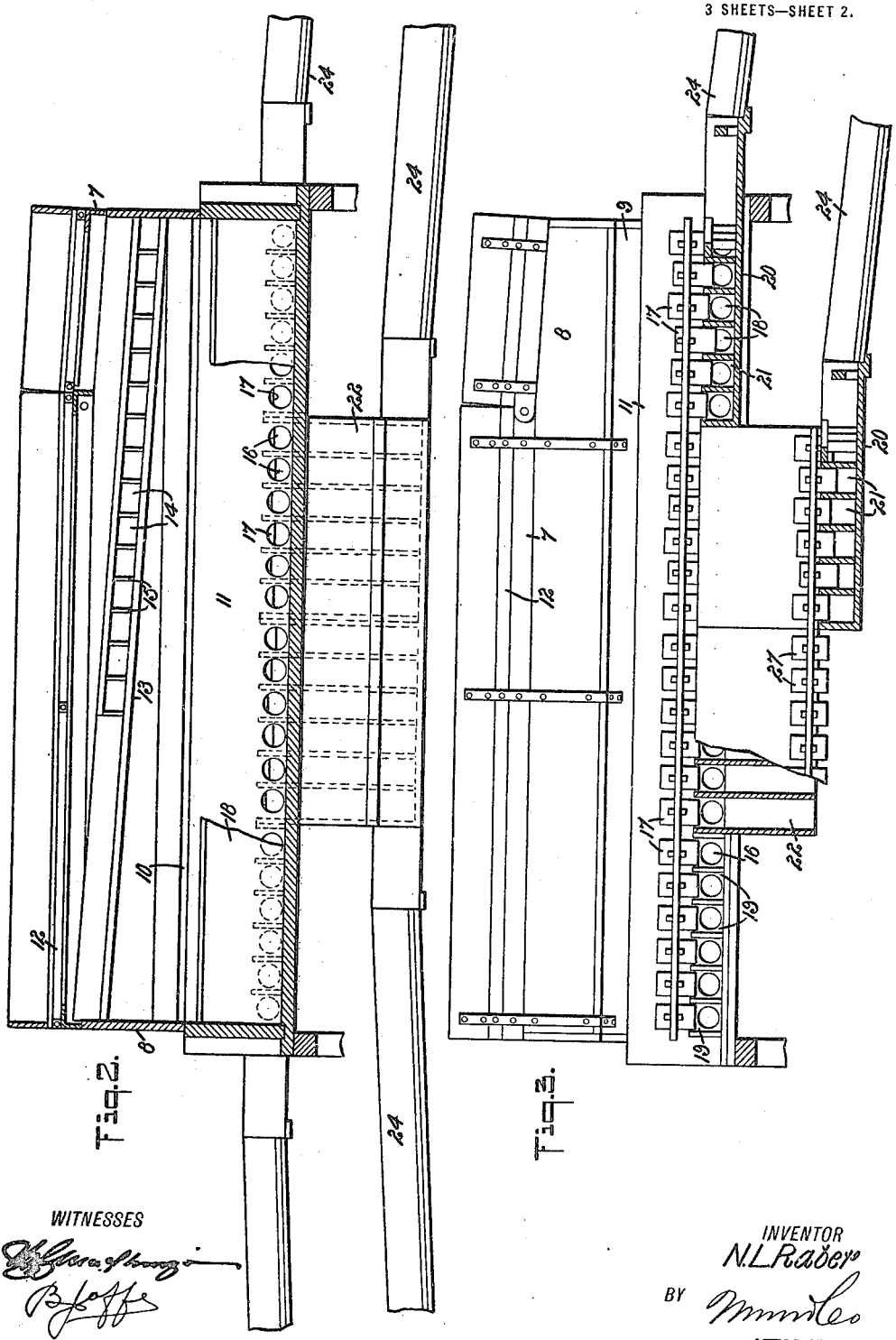

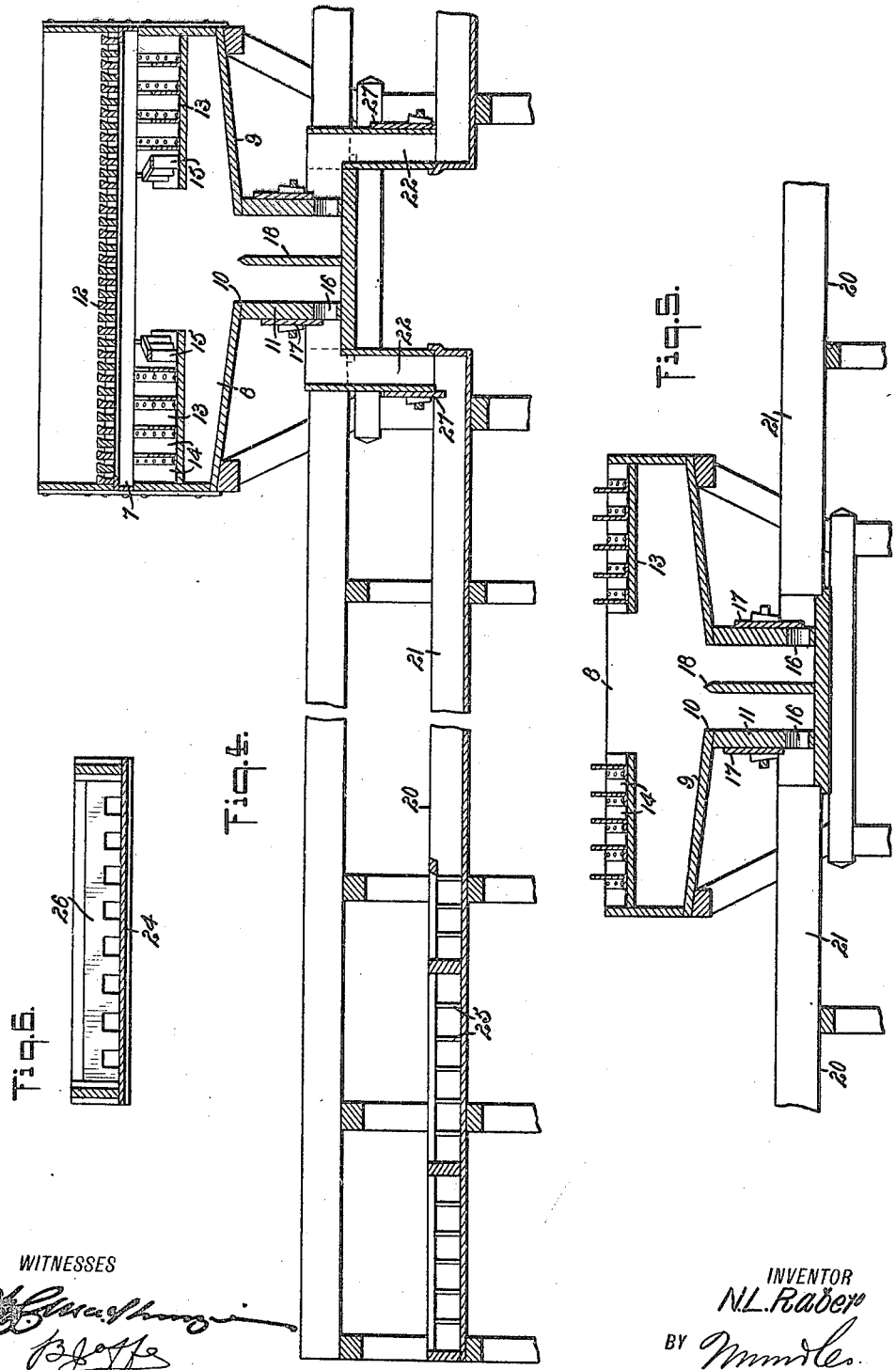

NATHAN L. RABER, OF CORVALLIS, OREGON.

GOLD-CONCENTRATING PLANT.

1,231,297.  Specification of Letters Patent.  Patented June 26, 1917.

Application filed May 19, 1916. Serial No. 98,589.

*To all whom it may concern:*

Be it known that I, NATHAN L. RABER, a citizen of the United States, and a resident of Corvallis, in the county of Benton and State of Oregon, have invented a new and Improved Gold-Concentrating Plant, of which the following is a full, clear, and exact description.

My invention relates to a plant for concentrating gold, and has reference more particularly to a distributer for the plant for controlling the distribution of the matter to be concentrated to the concentrating tables. The object of the invention is to provide a simple and efficient distributer between the grizzly and concentrating tables of the plant whereby the amount of matter to be concentrated, which passes through the grizzly, may be evenly distributed over the concentrating tables so that each table will do its share of work.

With the above and other objects in view, the nature of which will more fully appear as the description proceeds, the invention consists in the novel construction, combination and arrangement of parts as herein fully described, illustrated and claimed. In the accompanying drawings, forming part of the application, similar characters of reference indicate corresponding parts in all the views.

Fig. 2 is a vertical section through the receiver of the distributer on line 2—2, Fig. 1;

Fig. 3 is a section on line 3—3, Fig. 1, the portions on the left hand of the figure being removed and a portion on the left side of the figure being broken away to show the details of construction;

Fig. 4 is a longitudinal section on line 4—4, Fig. 1;

Fig. 5 is a similar section on line 5—5, Fig. 1; and

Fig. 6 is an elevation of the gate controlling the flow to the concentrating table.

Figure 1:
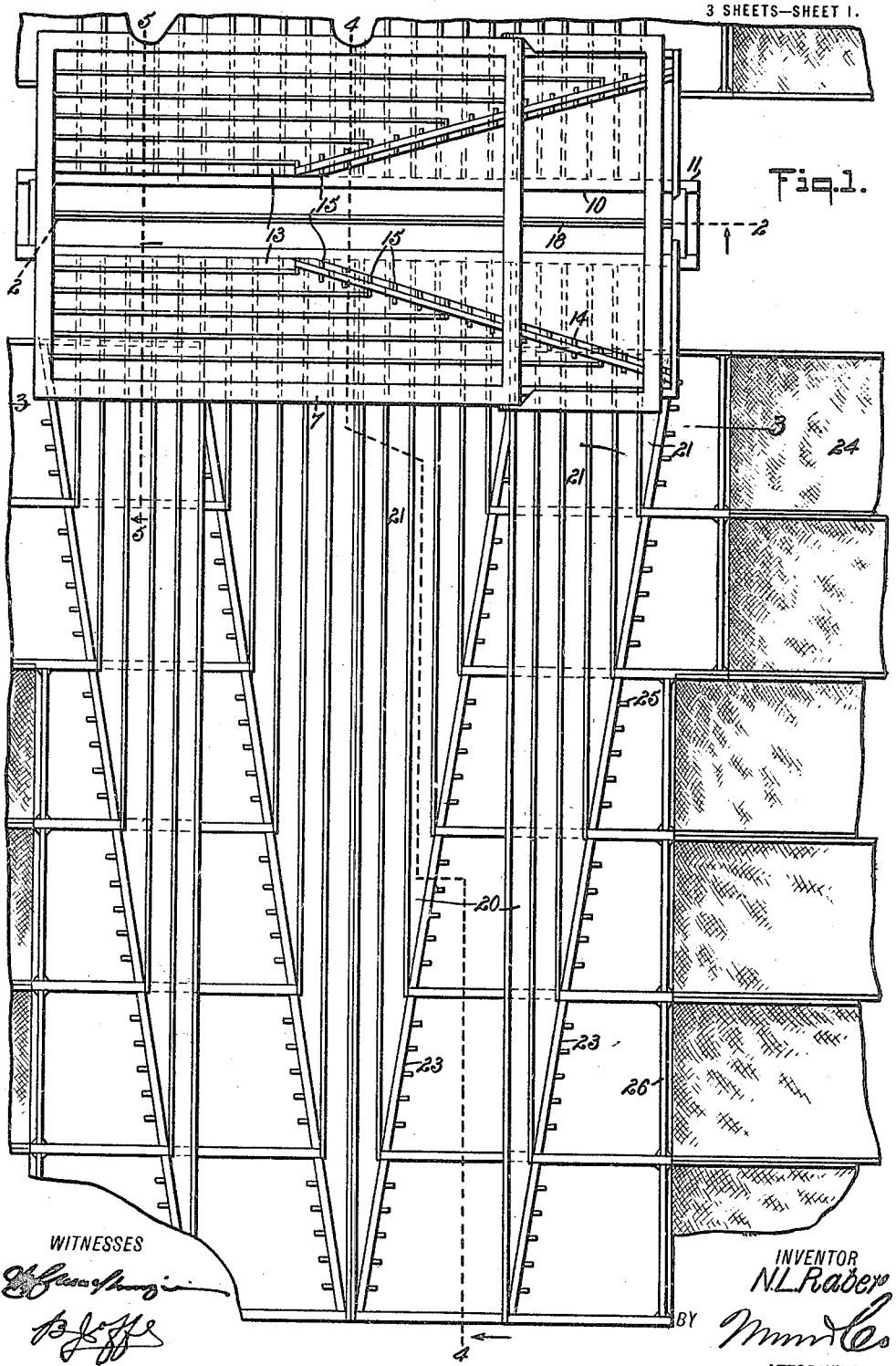
Figure 1 is a plan view of the concentrating plant in which only one of the delivering ends of the distributer is shown.

Referring to the drawings, 7 is the grizzly support which rests on the walls of a receiver 8, which is preferably in the shape of a hopper, the bottom 9 of which has a longitudinal central opening 10 extending through the entire length of the receiver, and to which opening the bottom converges from the sides. The opening 10 is in communication with a distributer or trough 11 extending through the entire length of the opening 10. The grizzly 12, carried by the grizzly support 7, will discharge the sand and fine gold delivered to the grizzly to the receiver 8 in the first few feet.

To distribute the gold and sand uniformly throughout the entire hopper or receiver 8, I provide a multi-channeled bed 13 on each side of the hopper spaced from the bottom 9 thereof and having enough fall longitudinally to carry the water, sand and fine gold to the desired points; but laterally the bed is level. Each bed is cut on a bias so that the lengths of the channels 14 thereupon decrease from the side toward the middle of the hopper. It will be seen that the spaces between the beds 13 will allow the material coming from the grizzly to drop directly into the hopper at the receiving end of the grizzly, while the channels 14 will carry the material dropped thereinto at the immediate entrance end of the grizzly toward the middle and the remote end of the carrier and thereby distribute the material falling upon the beds to the remote parts of the distributer; otherwise most of the material delivered to the grizzly would have passed at the receiving end thereof. At the biased edge the bed carries baffles 15 which are at right angles to the direction of flow in the channels. It will be noted that said baffles are placed to divide uniformly the discharging end of each channel of the bed. The width of the channels 14 may be varied to insure an equal distribution along the opening 10 in the hopper.

The trough 11 has discharge openings 16 in each side thereof at the bottom of the trough, each of the openings having an independent gate 17 which is carried by the trough on the outer surface of the sides and whereby the size of each opening may be varied. To prevent a larger outflow through the openings in one side than through those of the other side, a central longitudinal board 18 is provided within the trough which divides the trough into two independent parts, each in communication with the receiver or hopper 8, one part of the trough serving the concentrating plant to one side of the distributer and the other part serving the opposite side. Each opening discharges into a channel 19, the sides of which channels form guides for the corresponding gates 17.

The openings in each side of the trough discharge into four channeled beds 20, each having an equal number of channels 21, each channel being served by an opening 16. All of the beds are level. The flow in the channels results from the head obtained by backing the flow to the gates 17. The beds 20 at the ends of the trough are in direct communication with the channels 19 of the corresponding openings 16, while the beds 20 in the middle of the trough are at a lower level than the beds at the ends and are in communication with the corresponding channels 19 by chutes 22.

Each bed has a biased longitudinal edge 23 which brings the successive channels thereof in communication with successive heads of concentrating tables 24. The concentrating tables served by the same bed are substantially in the same horizontal plane, the table served by the middle beds being below the tables served by the adjacent end beds. Each channel at the biased edge 23 is provided with baffles 25 dividing the channel at the biased edge into an equal number of parts, said baffles being disposed at right angles to the direction of flow or to the length of the channel. These baffles deflect equal parts of the volume of sand and water at right angles and cause it to discharge on to the head of the concentrating tables.

Each concentrating table is separated from its head by a comb gate 26 whereby the volume of water and sand flowing to the concentrating table may be controlled. The channeled beds 20 are right and left (see Fig. 1) and, therefore, they are interchangeable for both sides of the trough. The vertical members on the beds which form the channels may be made of light angle iron of a sufficient height to carry the desired volume of water therethrough. The width of the channels may vary enough to insure an equal distribution of sand and water through said channels to the corresponding concentrating tables.

Each channel of the beds being controlled independently by a gate, any one of the tables may be cut off for repair or cleaning purposes, as the case may be, without in any way affecting the other concentrating tables in the same or any other series. The closing of one or more openings 16 by the corresponding gates or the reduction of cross section of the openings 16 by their corresponding gates will not disturb the even distribution of sand and water to the channels, due to the fact that the trough 11 is level, and, consequently, the backing of the water by the closing or reduction of the opening 16 will cause a rise of the sand and water uniformly within the trough; consequently, the quantity discharged to certain tables may be larger, but the distribution will be equal. The water and sand can also be backed within the trough 11 to obtain the desired head to carry the sand through the length of the beds.

The chutes 22 at their junction with the channels of the beds are provided with gates 27 similar to the gates 17 for the purpose of varying the outflow from the chutes to the channels. The said gates 27 allow the formation of a head for the channels of the bed corresponding therewith in case the head generated in the trough 11 is lost by the fall of water and sand through the chutes.

By increasing the width and the length of the grizzly, the capacity of the plant can be considerably increased, as the concentrating tables can be placed at more than two different levels if so desired, and the number of tables in each level may be increased with the increase of length in the grizzly.

I claim:

1. A gold concentrating plant comprising a grizzly, a distributer, a channeled receiver between the grizzly and distributer for delivering uniform streams of the matter coming from the grizzly over the area of the distributer, concentrating tables, and means for controlling the flow from the distributer to the respective tables and adapted to control the head in the distributer.

2. A gold concentrating plant comprising a grizzly, a distributer disposed substantially on a level, a hopper connecting the grizzly to the distributer, channeled beds carried by the hopper between the bottom thereof and the grizzly, said beds having a biased edge whereby said channels discharge at different points of the hopper bottom to serve uniformly the area of the distributer, concentrating tables, and means for controlling the flow from the distributer to the respective tables and adapted to control the head in the distributer.

3. A gold concentrating plant comprising a grizzly, a distributer in the shape of a trough disposed substantially level below the grizzly and central therewith, a hopper connecting the grizzly with the trough, channeled beds within the hopper on each side of the trough and above the same, said beds having a biased edge whereby each channel serves a predetermined part of the distributer, baffle plates at the biased edge for changing the direction of flow in the channels and sub-dividing the channels into a uniform number of parts, concentrating tables, and flow-controlling means from the distributer to the respective tables and adapted to control the head in the trough.

4. A gold concentrating plant comprising a grizzly, a distributer in the shape of a trough disposed on a level and central with the grizzly, a receiver in the shape of a hopper connecting the trough with the grizzly, channeled beds within the hopper on each side of the trough, said beds having a predetermined longitudinal flow and a biased edge forming the discharge end of the channels and whereby channels of various lengths are presented by each bed, baffle plates at the biased edge at right angles to the direction of flow in the channels, concentrating tables, and flow controlling means from the trough to the respective tables and adapted to control the head in the trough.

5. A gold concentrating plant comprising a grizzly, a distributer in the shape of a trough disposed on a level below the grizzly, a hopper connecting the grizzly with the trough, a channeled bed within the hopper of the trough, said bed having a predetermined longitudinal flow and a biased edge at the discharge end of the channels whereby channels of various lengths are presented by the bed, baffle plates within the channels at the biased edge at right angles to the direction of flow in the channels, said baffles sub-dividing the channels into a uniform number of parts, concentrating tables, and flow control means from the trough to the respective tables and adapted to control the head in the trough.

6. A gold concentrating plant comprising a grizzly, a distributer, a receiver between the grizzly and distributer, including means for delivering uniformly the matter coming from the grizzly to the area of the distributer, concentrating tables at different levels, channeled beds from the distributer to the concentrating tables, and means for controlling the flow to each of the channels.

7. A gold concentrating plant comprising a grizzly, a trough disposed substantially on the level, a receiver connecting the grizzly with the trough, including means for delivering uniformly the matter coming from the grizzly to the area of the trough, a series of concentrating tables disposed at different levels, a channeled bed for each series of tables for conveying the matter from the trough to the tables, said channeled beds being on levels corresponding with the tables and disposed in substantially horizontal planes, the beds of the higher level being in a plane with the bottom of the trough, chutes connecting the trough with the beds of the lower level, gates at the inlet ends of the channel for controlling the flow through the channels and whereby the head in the trough is controlled, each of said beds having a biased longitudinal edge coöperating with the corresponding tables and whereby each channel serves a table, and baffle plates within each channel at the biased edge disposed at right angles to the flow.

8. A gold concentrating plant comprising a grizzly, a trough, a receiver connecting the grizzly with the trough, a series of concentrating tables disposed at different levels, a channeled bed for each series of tables for conveying the matter from the trough to the tables, said channeled beds being on levels corresponding with the tables, the beds of the higher level being in a plane with the bottom of the trough, chutes connecting the trough with the beds of the lower level, and means for controlling the flow through the channels.

NATHAN L. RABER.

Copies of this patent may be obtained for five cents each, by addressing the "Commissioner of Patents, Washington, D. C."